United States Patent [19]

Gaidis

[11] Patent Number: 5,053,080
[45] Date of Patent: Oct. 1, 1991

[54] STABILIZED ASPHALT

[75] Inventor: James M. Gaidis, Ellicott City, Md.

[73] Assignee: W. R. Grace & Co.-Conn., New York, N.Y.

[21] Appl. No.: 617,119

[22] Filed: Nov. 20, 1990

[51] Int. Cl.$^5$ .................... C08L 95/00; C09D 201/00
[52] U.S. Cl. .................................. 106/278; 106/123.2
[58] Field of Search ............................. 106/278, 123.2

[56] References Cited

U.S. PATENT DOCUMENTS

| 2,483,797 | 11/1948 | Valkenburgh | 260/97.5 |
| 4,433,084 | 2/1984 | Ostermeyer et al. | 106/277 |
| 4,676,927 | 6/1987 | Schilling et al. | 106/277 |

Primary Examiner—Theodore Morris
Assistant Examiner—Mary C. DiNunzio
Attorney, Agent, or Firm—Howard J. Troffkin

[57] ABSTRACT

A process for stabilizing asphalt is disclosed which requires mixing with the asphalt a stabilizing mixture composed of tall oil acid salts of alkali or alkaline earth metals in combination with free tall oil acid present in at least 30 molar percent of the total acid content.

13 Claims, No Drawings

STABILIZED ASPHALT

BACKGROUND OF THE INVENTION

The present invention is directed to a process for stabilizing asphalt compositions and to compositions for attaining the desired result.

Asphalt material is utilized in many applications including road formation, roofing compositions, roofing materials (shingles, felt etc.), waterproofing coatings and compositions, etc. The material is normally a product obtained as the bottoms from petroleum distillation directly or upon further processing of the bottom material, such as by steam distillation or the like. The initially obtained asphalt has flow characteristics which make it unsuitable for a number of applications. The raw asphalt normally has a low softening point (e.g. 120° F.) which causes it to flow at relatively low temperatures and, therefore, is unsuitable in applications such as roofing material and the like. It is customary to treat the raw asphalt to increase its softening point. This is commonly done by blowing oxygen (or air) into molten asphalt to increase the asphaltenes in the composition and, thus, to raise its softening point to a desired range (e.g. 180°–200° F.). Such materials are known as blown asphalt or oxidized asphalt.

Asphalt compositions having elevated softening points are normally stored for several days as a liquid in commercial application. Storage is normally done at 300°–500° F. in order to provide a fluid composition which is easily handled and processed into final products. During storage at such elevated temperature, the asphalt material undergoes reversion, a reduction in its softening point. This poses the problem of having asphalt which is not of the quality desired (i.e. has too low a softening point) or requires excessive initial oxidation to produce a higher grade product with the intention of providing a controlled degree of degradation to achieve the asphalt of desired quality. The former condition is not commercially acceptable and the latter method is economically unacceptable and difficult to control.

Several methods have been suggested to control and stabilize asphaltic material including the addition of soaps to the composition. However, such materials are not compatible with asphalt and are not readily mixable to form a uniform composition which can sustain elevated temperatures over a sustained period.

It is highly desired to develop a method which will provide for a means of stabilizing asphaltic compositions from undergoing reversion of its softening point while being stored in a liquid state at elevated temperatures.

SUMMARY OF THE INVENTION

The present invention provides a means of stabilizing (with respect to softening point characteristics) asphaltic materials and to compositions for accomplishing same.

The present invention requires mixing an asphaltic material with a composition comprising a mixture of an alkali or alkaline earth metal salt of tall oil acid in combination with at least about 30 mole percent of free tall oil acid. The composition may further contain a minor amount of black liquor from wood pulp processing.

DETAILED DESCRIPTION

The present invention provided a process for stabilizing asphalt material. The process requires mixing asphalt material with a stabilizing amount of a partially neutralized tall oil acid material, as fully described herein below.

In the production of paper pulp from wood, various by-products are formed, including a black liquor which contains lignin and the like; and a waxy, semi-solid tall oil soap which is composed of higher straight chain fatty acid salts and rosin acid salts. In the pulp formation process (Kraft Process), wood particles are conventionally mixed with an aqueous solution of sodium hydroxide, sodium sulfide and sodium carbonate and heated over a prolonged period to obtain cellulosic material which is separated from the liquid The liquid, upon evaporation and cooling, separates into a substantially waxy solid and a liquid product. The waxy solid is commonly referred to as tall oil soap composed of a mixture of sodium neutralized soaps formed from straight chain fatty (e.g. $C_{14}$–$C_{18}$) acids and rosin (non-aromatic ring compounds) acids. This soap product contains at least about thirty-five percent water. The waxy product is readily skimmed off. The remaining liquid phase is commonly referred to as black liquor and is an aqueous solution of lignin and phenolic salts.

It has been unexpectedly found that the wood-pulp processing by-products can be modified to provide a stabilizing composition for asphaltic materials. The stabilizing composition is composed of a partially neutralized tall oil soap composition. The tall oil soap is composed of alkali or alkaline earth metal salts (preferably alkali metal, most preferably sodium) of the tall oil acids, as described herein above. The soap can be neutralized with any mineral acid, such as sulfuric acid, hydrochloric acid, phosphoric acid and the like (sulfuric acid is preferred). The acid should preferably be used in concentrated form in order to add minimum amounts of water to the composition. The neutralization should be at least 30 molar percent of the total acid of the tall oil soap. Complete neutralization is acceptable although need not be accomplished to provide a useful composition. Tall oil soaps which contain from about 30 to about 70 molar percent neutralized acid are preferred.

The subject stabilizing composition should not contain large amounts of water. The water content should be less than 30 wt. percent. Normally, the water content of the composition should be from about 5 wt. % to 30 wt % with from about 5 to 20 wt. % being preferred.

The subject stabilizing composition can be formed by treating the skimmed-off tall oil soap, as obtained from the Kraft or related process. The soap is neutralized with mineral acid to the degree desired. A portion of the water is then removed to provide the desired stabilizing composition. Alternately, the fatty acid soap can be treated to remove a substantial portion of the water present (Such a dried product (about 5% $H_2O$) is sold by W.R. Grace & Co.-Conn. under the Tradename "Dry Airalon"). The dried material can be neutralized to the desired degree with mineral acid (preferably conc. $H_2SO_4$ to avoid water addition). Because the pre-dried soap is more difficult to mix with the acid, it is preferable to mix some skimmed tall oil soap, as obtained, with dried soap in the course of the neutralization.

The resultant neutralized tall oil soap composition of the present invention is a fluid composition capable of being easily mixed with asphaltic materials. The stabilizing composition can be readily introduced and mixed with the asphalt while the asphalt is being blown with air or oxygen to cause its increase in softening point. Alternatively, the stabilizing composition can be readily introduced and mixed at the onset of storage of the molten asphalt. The stabilizing amount of the subject composition normally needed is from about 0.1 to about 2 percent by wt. of the total mixture, preferably from about 0.1 to 1 percent by wt.

A further embodiment of the present invention is the formation and use of a stabilizing composition composed of the partially neutralized tall oil soap, as described above, with a minor amount of black liquor by-product such as obtained in the pulp formation. When such a composition is formed, the neutralization is preferably first performed on the tall oil soaps. The composition can be a mixture of up to about 50 (preferably 30) percent by weight of black liquor. It is preferable to limit the black liquor content to an amount which provides a total water content of the stabilizing composition to be less than the 30 percent without further removal of water.

The composition containing black liquor as a component should be formed by first neutralizing the soap material, as described above and then mixing the partially neutralized soap with the black liquor by-product. Further drying of the resultant composition may be done to reduce the total water content of the stabilizing composition. Drying can be accomplished by various conventional techniques such as water aspiration, passing an inert gas through the composition to drive the water out or the like.

The resultant stabilizing composition is a fluid material (200,000–500,000 cps at 25° C.) capable of readily mixing with asphaltic materials and stabilizing the same from degradation of its desired softening point even when stored at elevated (300°–500° F.) temperatures, as is conventionally done in commercial applications.

The following examples are given for illustrative purposes and are not meant to limit the subject invention as defined by the appended claims. All parts and percentages are by weight unless otherwise indicated.

EXAMPLE 1

In a 1 L beaker containing 400 grams of tall oil soap skimmings (35% $H_2O$) was added 120 grams of concentrated sulfuric acid. The combination foamed slightly but the foam quickly subsided. The liquid was then poured over 1600 grams of previously dried tall oil soap (6.8% $H_2O$) and stirred at room temperature until a uniform consistency was reached. The composition was heated to 50° C. for 1 hour with stirring to assure uniformity. The resultant material had a viscosity at room temperature of 384,000 centipoise and would be easily pumpable. Calculated water content was 11.7%, and total volatiles at 105° C. for 1 hour was 16.5%.

EXAMPLE 2

Soap skimmings having 35% water (1474g), dried (6.8% $H_2O$) tall oil soap (2990g) and concentrated sulfuric acid (190g) were combined in a 5 gallon container with the aid of an electric mixer. After about 30 seconds of mixing, 1960 grams of black liquor (20.8% solids, pH=13.2) was added and mixed thoroughly. The combination was put on a hot plate and flushed with $N_2$, taking off 978g $H_2O$. Calculated water content of the resultant composition was 19.6%. The total volatiles loss on heating to 105° C. for 1 hour was 29.5%. The composition was a fluid material which readily mixed with asphalt having a high softening point.

The treated asphalt was heated (300° F.) and analyzed and showed substantially no reduction in softening point over time.

EXAMPLE 3

Samples of oxidized asphalt having a softening point of 180° F. are heated to 350° F. To respective samples is introduced stabilizing compositions prepared in Examples 1 and 2 above in dosages of 1 wt. percent based on the total weight of each sample. The stabilizing compositions are prewarmed to 100° F. and the fluid materials readily mixed.

The resultant asphalt compositions are maintained at 350° F. for 10 days simulating commercial production storage conditions. The softening point is measured at the end of the 10 day period and found to be within 5° F. of the initial value.

For comparative purposes, samples of the same untreated asphalt are heated to 350° F. and maintained at that temperature for 10 days. The softening point of the asphalt decreased by at least 20° F.

What is claimed:

1. A process for stabilizing blown asphalt to substantially maintain its softening point comprising introducing into the blown asphalt an effective amount to stabilize the softening point of said asphalt of a mixture composed of alkali or alkaline earth metal tall oil acid salt material and free tall oil acid material, said free tall oil acid being at least about 30 molar percent of the total acid of said mixture.

2. The process of claim 1 wherein said mixture contains less than 30 wt. percent water.

3. The process of claim 1 wherein the stabilizing amount is from 0.1 to 2 wt. percent of the total asphalt composition.

4. The process of claim 2 wherein the stabilizing amount is from 0.1 to 2 wt. percent of the total asphalt composition.

5. The process of claim 1 wherein the tall oil acid salt material is composed of sodium tall oil acid salts.

6. The process of claim 2 wherein the tall oil acid salt material is composed of sodium tall oil acid salts.

7. The process of claim 3 wherein the tall oil acid salt material is composed of sodium tall oil acid salts.

8. The process of claim 4 wherein the tall oil acid salt material is composed of sodium tall oil acid salts.

9. The process of claim 1 wherein the asphalt is mixed with 0.1 to 1 wt. percent of a stabilizing mixture composed of sodium tall oil acid salt material and free tall oil acid material, said free tall oil acid being from about 30 to 70 molar percent of the total acid of said mixture, and said mixture being from about 5 to 30 wt. percent water.

10. The process of claim 1 wherein the stabilizing mixture further contains up to 50 wt. percent of black liquor of wood-pulp formation.

11. The process of claim 3 wherein the stabilizing mixture further contains up to 50 wt. percent of black liquor of wood-pulp formation.

12. The process of claim 5 wherein the stabilizing mixture further contains up to 50 wt. percent of black liquor of wood-pulp formation.

13. The process of claim 9 wherein the stabilizing mixture further contains up to 50 wt. percent of black liquor of wood-pulp formation.

* * * * *